(12) United States Patent
Floyd

(10) Patent No.: US 7,161,730 B2
(45) Date of Patent: Jan. 9, 2007

(54) SYSTEM AND METHOD FOR PROVIDING THERMAL COMPENSATION FOR AN INTERFEROMETRIC MODULATOR DISPLAY

(75) Inventor: Philip D. Floyd, Redwood City, CA (US)

(73) Assignee: IDC, LLC, San Francisco, CA (US)

( * ) Notice: Subject to any disclaimer, the term of this patent is extended or adjusted under 35 U.S.C. 154(b) by 0 days.

(21) Appl. No.: 11/188,130

(22) Filed: Jul. 22, 2005

(65) Prior Publication Data

US 2006/0077519 A1 Apr. 13, 2006

Related U.S. Application Data

(60) Provisional application No. 60/613,610, filed on Sep. 27, 2004.

(51) Int. Cl.
G02B 26/00 (2006.01)
(52) U.S. Cl. ........................ 359/291; 359/290
(58) Field of Classification Search ................. 359/290, 359/291, 223, 224, 292, 295, 238, 578, 579
See application file for complete search history.

(56) References Cited

U.S. PATENT DOCUMENTS

| | | | |
|---|---|---|---|
| 2,534,846 A | 12/1950 | Ambrose et al. | |
| 3,439,973 A | 4/1969 | Paul et al. | |
| 3,443,854 A | 5/1969 | Weiss | |
| 3,653,741 A | 4/1972 | Marks | |
| 3,656,836 A | 4/1972 | de Cremoux et al. | |
| 3,725,868 A | 4/1973 | Malmer, Jr. et al. | |
| 3,813,265 A | 5/1974 | Marks | |
| 3,955,880 A | 5/1976 | Lierke | |
| 4,099,854 A | 7/1978 | Decker et al. | |
| 4,196,396 A | 4/1980 | Smith | |
| 4,228,437 A | 10/1980 | Shelton | |
| 4,377,324 A | 3/1983 | Durand et al. | |
| 4,389,096 A | 6/1983 | Hori et al. | |
| 4,403,248 A | 9/1983 | te Velde | |
| 4,441,791 A | 4/1984 | Hornbeck | |

(Continued)

FOREIGN PATENT DOCUMENTS

CH  681 047  12/1992

(Continued)

OTHER PUBLICATIONS

International Search Report for application No. PCT/US2005/031237, mailed Dec. 29, 2005.

(Continued)

*Primary Examiner*—Timothy Thompson
(74) *Attorney, Agent, or Firm*—Knobbe, Martens, Olson & Bear LLP

(57) ABSTRACT

Various embodiments of the invention relate to methods and systems for thermal compensation of a MEMS device. In certain embodiments, an interferometric modulator includes a first electrode and a flexible second electrode situated on a substrate. The flexible second electrode is a movable layer that can comprise aluminum or an aluminum-containing material, while the substrate can comprise glass. When the interferometric modulator undergoes a temperature change, the difference in thermal expansion rates results in a decrease in the tensile strain on the movable layer. Embodiments of the present invention provide a film configured to compensate for the thermal expansion. The film has a thermal expansion coefficient less than the substrate so as to compensate for expansion of the movable layer with respect to the substrate when the MEMS is exposed to thermal energy. The film compensates for mismatch in thermal expansion between the materials of the substrate and movable layer so as to inhibit undesirable optical characteristics.

38 Claims, 12 Drawing Sheets

U.S. PATENT DOCUMENTS

| | | |
|---|---|---|
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,937,496 A | 6/1990 | Neiger et al. |
| 4,954,789 A | 9/1990 | Sampsell |
| 4,956,619 A | 9/1990 | Hornbeck |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,296,950 A | 3/1994 | Lin et al. |
| 5,299,041 A | 3/1994 | Morin et al. |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,345,328 A | 9/1994 | Fritz et al. |
| 5,365,283 A | 11/1994 | Doherty et al. |
| 5,381,232 A | 1/1995 | van Wijk |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,500,635 A | 3/1996 | Mott |
| 5,500,761 A | 3/1996 | Goossen et al. |
| 5,503,952 A | 4/1996 | Suzuki et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoades et al. |
| 5,619,366 A | 4/1997 | Rhoads et al. |
| 5,622,814 A | 4/1997 | Miyata et al. |
| 5,629,790 A | 5/1997 | Neukermans et al. |
| 5,633,652 A | 5/1997 | Kanbe et al. |
| 5,636,052 A | 6/1997 | Arney et al. |
| 5,636,185 A | 6/1997 | Brewer et al. |
| 5,638,084 A | 6/1997 | Kalt |
| 5,638,946 A | 6/1997 | Zavracky |
| 5,641,391 A | 6/1997 | Hunter et al. |
| 5,646,768 A | 7/1997 | Kaeiyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,673,139 A | 9/1997 | Johnson |
| 5,674,757 A | 10/1997 | Kim |

| | | |
|---|---|---|
| 5,683,591 A | 11/1997 | Offenberg |
| 5,703,710 A | 12/1997 | Brinkman et al. |
| 5,706,022 A | 1/1998 | Hato |
| 5,710,656 A | 1/1998 | Goosen |
| 5,726,480 A | 3/1998 | Pister |
| 5,739,945 A | 4/1998 | Tayebati |
| 5,745,193 A | 4/1998 | Urbanus et al. |
| 5,745,281 A | 4/1998 | Yi et al. |
| 5,771,116 A | 6/1998 | Miller et al. |
| 5,784,190 A | 7/1998 | Worley |
| 5,784,212 A | 7/1998 | Hornbeck |
| 5,793,504 A | 8/1998 | Stoll |
| 5,808,780 A | 9/1998 | McDonald |
| 5,818,095 A | 10/1998 | Sampsell |
| 5,825,528 A | 10/1998 | Goosen |
| 5,835,255 A | 11/1998 | Miles et al. |
| 5,842,088 A | 11/1998 | Thompson |
| 5,912,758 A | 6/1999 | Knipe et al. |
| 5,943,158 A | 8/1999 | Ford et al. |
| 5,959,763 A | 9/1999 | Bozler et al. |
| 5,972,193 A | 10/1999 | Chou et al. |
| 5,976,902 A | 11/1999 | Shih |
| 5,986,796 A | 11/1999 | Miles |
| 6,028,690 A | 2/2000 | Carter et al. |
| 6,038,056 A | 3/2000 | Florence et al. |
| 6,040,937 A | 3/2000 | Miles |
| 6,049,317 A | 4/2000 | Thompson et al. |
| 6,055,090 A | 4/2000 | Miles |
| 6,061,075 A | 5/2000 | Nelson et al. |
| 6,099,132 A | 8/2000 | Kaeriyama |
| 6,100,872 A | 8/2000 | Aratani et al. |
| 6,113,239 A | 9/2000 | Sampsell et al. |
| 6,147,790 A | 11/2000 | Meier et al. |
| 6,160,833 A | 12/2000 | Floyd et al. |
| 6,180,428 B1 | 1/2001 | Peeters et al. |
| 6,195,196 B1 | 2/2001 | Kimura et al. |
| 6,201,633 B1 | 3/2001 | Peeters et al. |
| 6,232,936 B1 | 5/2001 | Gove et al. |
| 6,243,149 B1 | 6/2001 | Swanson et al. |
| 6,282,010 B1 | 8/2001 | Sulzbach et al. |
| 6,284,560 B1 | 9/2001 | Jech et al. |
| 6,295,154 B1 | 9/2001 | Laor et al. |
| 6,323,982 B1 | 11/2001 | Hornbeck |
| 6,356,254 B1 | 3/2002 | Kimura |
| 6,376,787 B1 | 4/2002 | Martin et al. |
| 6,392,233 B1 | 5/2002 | Channin et al. |
| 6,407,851 B1 | 6/2002 | Islam et al. |
| 6,447,126 B1 | 9/2002 | Hornbeck |
| 6,452,465 B1 | 9/2002 | Brown et al. |
| 6,456,420 B1 | 9/2002 | Goodwin-Johansson |
| 6,465,355 B1 | 10/2002 | Horsley |
| 6,466,354 B1 | 10/2002 | Gudeman |
| 6,466,358 B1 | 10/2002 | Tew |
| 6,473,274 B1 | 10/2002 | Maimone et al. |
| 6,480,177 B1 | 11/2002 | Doherty et al. |
| 6,496,122 B1 | 12/2002 | Sampsell |
| 6,513,911 B1 | 2/2003 | Ozaki et al. |
| 6,545,335 B1 | 4/2003 | Chua et al. |
| 6,548,908 B1 | 4/2003 | Chua et al. |
| 6,549,338 B1 | 4/2003 | Wolverton et al. |
| 6,552,840 B1 | 4/2003 | Knipe |
| 6,574,033 B1 | 6/2003 | Chui et al. |
| 6,589,625 B1 | 7/2003 | Kothari et al. |
| 6,600,201 B1 | 7/2003 | Hartwell et al. |
| 6,606,175 B1 | 8/2003 | Sampsell et al. |
| 6,608,268 B1 | 8/2003 | Goldsmith |
| 6,625,047 B1 | 9/2003 | Coleman, Jr. |
| 6,630,786 B1 | 10/2003 | Cummings et al. |
| 6,632,698 B1 | 10/2003 | Ives |
| 6,635,919 B1 | 10/2003 | Melendez et al. |
| 6,643,069 B1 | 11/2003 | Dewald |
| 6,650,455 B1 | 11/2003 | Miles |
| 6,657,832 B1 | 12/2003 | Williams et al. |
| 6,666,561 B1 | 12/2003 | Blakley |
| 6,674,562 B1 | 1/2004 | Miles et al. |
| 6,680,792 B1 | 1/2004 | Miles |
| 6,710,908 B1 | 3/2004 | Miles et al. |
| 6,720,267 B1 | 4/2004 | Chen et al. |
| 6,736,987 B1 | 5/2004 | Cho |
| 6,741,377 B1 | 5/2004 | Miles |
| 6,741,384 B1 | 5/2004 | Martin et al. |
| 6,741,503 B1 | 5/2004 | Farris et al. |
| 6,743,570 B1 | 6/2004 | Harnett et al. |
| 6,747,785 B1 | 6/2004 | Chen et al. |
| 6,747,800 B1 | 6/2004 | Lin |
| 6,756,317 B1 | 6/2004 | Sniegowski et al. |
| 6,775,174 B1 | 8/2004 | Huffman et al. |
| 6,778,155 B1 | 8/2004 | Doherty et al. |
| 6,778,306 B1 | 8/2004 | Sniegowski et al. |
| 6,794,119 B1 | 9/2004 | Miles |
| 6,811,267 B1 | 11/2004 | Allen et al. |
| 6,812,482 B1 | 11/2004 | Fleming et al. |
| 6,819,469 B1 | 11/2004 | Koba |
| 6,822,628 B1 | 11/2004 | Dunphy et al. |
| 6,829,132 B1 | 12/2004 | Martin et al. |
| 6,853,129 B1 | 2/2005 | Cummings et al. |
| 6,855,610 B1 | 2/2005 | Tung et al. |
| 6,859,218 B1 | 2/2005 | Luman et al. |
| 6,861,277 B1 | 3/2005 | Monroe et al. |
| 6,862,022 B1 | 3/2005 | Slupe |
| 6,862,029 B1 | 3/2005 | D'Souza et al. |
| 6,867,896 B1 | 3/2005 | Miles |
| 6,870,581 B1 | 3/2005 | Li et al. |
| 6,870,654 B1 | 3/2005 | Lin et al. |
| 6,882,458 B1 | 4/2005 | Lin et al. |
| 6,882,461 B1 | 4/2005 | Tsai et al. |
| 6,912,022 B1 | 6/2005 | Lin et al. |
| 6,952,303 B1 | 10/2005 | Lin et al. |
| 6,958,847 B1 | 10/2005 | Lin |
| 6,987,432 B1 * | 1/2006 | Lutz et al. ................. 333/186 |
| 2001/0003487 A1 | 6/2001 | Miles |
| 2001/0026951 A1 | 10/2001 | Vergani et al. |
| 2001/0040649 A1 | 11/2001 | Ozaki |
| 2001/0040675 A1 | 11/2001 | True et al. |
| 2002/0015215 A1 | 2/2002 | Miles |
| 2002/0036304 A1 | 3/2002 | Ehmke et al. |
| 2002/0054424 A1 | 5/2002 | Miles |
| 2002/0055253 A1 | 5/2002 | Rudhard |
| 2002/0075555 A1 | 6/2002 | Miles |
| 2002/0126364 A1 | 9/2002 | Miles |
| 2002/0135857 A1 | 9/2002 | Fitzpatrick et al. |
| 2002/0137072 A1 | 9/2002 | Mirkin et al. |
| 2002/0168136 A1 | 11/2002 | Atia et al. |
| 2003/0006468 A1 | 1/2003 | Ma et al. |
| 2003/0043157 A1 | 3/2003 | Miles |
| 2003/0062186 A1 | 4/2003 | Boroson et al. |
| 2003/0072070 A1 | 4/2003 | Miles |
| 2003/0090350 A1 | 5/2003 | Feng et al. |
| 2003/0152872 A1 | 8/2003 | Miles |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2004/0010115 A1 | 1/2004 | Sotzing |
| 2004/0027636 A1 | 2/2004 | Miles |
| 2004/0027701 A1 | 2/2004 | Ishikawa |
| 2004/0028849 A1 | 2/2004 | Stark et al. |
| 2004/0035821 A1 | 2/2004 | Doan et al. |
| 2004/0051929 A1 | 3/2004 | Sampsell et al. |
| 2004/0053434 A1 | 3/2004 | Bruner |
| 2004/0058532 A1 | 3/2004 | Miles et al. |
| 2004/0061543 A1 | 4/2004 | Nam et al. |
| 2004/0063322 A1 | 4/2004 | Yang |
| 2004/0080807 A1 | 4/2004 | Chen et al. |
| 2004/0080832 A1 | 4/2004 | Singh |
| 2004/0100677 A1 | 5/2004 | Huibers et al. |
| 2004/0124073 A1 | 7/2004 | Pilans et al. |

| | | |
|---|---|---|
| 2004/0125281 A1 | 7/2004 | Lin et al. |
| 2004/0125282 A1 | 7/2004 | Lin et al. |
| 2004/0145049 A1 | 7/2004 | McKinnell et al. |
| 2004/0145811 A1 | 7/2004 | Lin et al. |
| 2004/0147056 A1 | 7/2004 | McKinnell et al. |
| 2004/0147198 A1 | 7/2004 | Lin et al. |
| 2004/0150869 A1 | 8/2004 | Kasai |
| 2004/0160143 A1 | 8/2004 | Shreeve et al. |
| 2004/0174583 A1 | 9/2004 | Chen et al. |
| 2004/0175577 A1 | 9/2004 | Lin et al. |
| 2004/0179281 A1 | 9/2004 | Reboa |
| 2004/0191937 A1 | 9/2004 | Patel et al. |
| 2004/0207897 A1 | 10/2004 | Lin |
| 2004/0209192 A1 | 10/2004 | Lin et al. |
| 2004/0209195 A1 | 10/2004 | Lin |
| 2004/0212026 A1 | 10/2004 | Van Brocklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0227493 A1 | 11/2004 | Van Brocklin et al. |
| 2004/0240027 A1 | 12/2004 | Lin et al. |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0003667 A1 | 1/2005 | Lin et al. |
| 2005/0020089 A1 | 1/2005 | Shi et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0036192 A1 | 2/2005 | Lin et al. |
| 2005/0038950 A1 | 2/2005 | Adelmann |
| 2005/0042117 A1 | 2/2005 | Lin |
| 2005/0046922 A1 | 3/2005 | Lin et al. |
| 2005/0046948 A1 | 3/2005 | Lin |
| 2005/0057442 A1 | 3/2005 | Way |
| 2005/0068583 A1 | 3/2005 | Gutkowski et al. |
| 2005/0068605 A1 | 3/2005 | Tsai |
| 2005/0068606 A1 | 3/2005 | Tsai |
| 2005/0069209 A1 | 3/2005 | Damera-Venkata et al. |
| 2005/0078348 A1 | 4/2005 | Lin |
| 2005/0168849 A1 | 8/2005 | Lin |
| 2005/0195462 A1 | 9/2005 | Lin |
| 2005/0202649 A1 | 9/2005 | Hung et al. |

FOREIGN PATENT DOCUMENTS

| | | |
|---|---|---|
| DE | 10228946 A1 | 1/2004 |
| EP | 0 667 548 A1 | 8/1995 |
| EP | 0878824 A2 | 11/1998 |
| EP | 1 452 481 A | 9/2004 |
| JP | 405275401 A | 10/1993 |
| JP | 2002 062493 | 2/2002 |
| JP | 2003001598 A | 1/2003 |
| JP | 2004106074 A | 4/2004 |
| JP | 2005051007 A | 2/2005 |
| WO | WO9530924 | 11/1995 |
| WO | WO9717628 | 5/1997 |
| WO | WO9952006 A2 | 10/1999 |
| WO | WO9952006 A3 | 10/1999 |
| WO | WO0114248 | 3/2001 |
| WO | WO 02/24570 | 3/2002 |
| WO | WO03007049 A1 | 1/2003 |
| WO | WO 03/052506 | 6/2003 |
| WO | WO 03/069413 A | 8/2003 |
| WO | WO03069413 A1 | 8/2003 |
| WO | WO03073151 A1 | 9/2003 |
| WO | WO04006003 A1 | 1/2004 |
| WO | WO04026757 A2 | 4/2004 |
| WO | WO 2005/019899 A1 | 3/2005 |

OTHER PUBLICATIONS

Akasaka, "Three-Dimensional IC Trends," Proceedings of IEEE, vol. 74, No. 12, pp. 1703-1714, (Dec. 1986).

Austrian Search Report dated May 4, 2005.

Austrian Search Report dated Aug. 12, 2005.

Aratani et al., "Surface micromachined tuneable interferometer array," Sensors and Actuators, pp. 17-23. (1994).

Conner, "Hybrid Color Display Using Optical Interference Filter Array," SID Digest, pp. 577-580 (1993).

EP 05255661.0 European Search Report (Dec. 30, 2005).

Fan et al., "Channel Drop Filters in Photonic Crystals," Optics Express, vol. 3, No. 1 (1998).

Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119, 1121 (Sep. 1994).

Goossen K.W., "MEMS-Based Variable Optical Interference Devices", Optical MEMS, 2000 IEEE/Leos International Conference on Aug. 21-24, 2000, Piscataway, NJ, USA, IEE, Aug. 21, 2000, pp. 17-18.

Gosch, "West Germany Grabs the Lead in X-Ray Lithography," Electronics pp. 78-80 (Feb. 5, 1987).

Harnett et al., "Heat-depolymerizable polycarbonates as electron beam patternable sacrificial layers for nanofluidics," J. Vac. Sci. Technol. B 19(6), (Nov./Dec. 2001), pp. 2842-2845.

Howard et al., "Nanometer-Scale Fabrication Techniques," VLSI Electronics: Microstructure Science, vol. 5, pp. 145-153 and pp. 166-173 (1982).

Ibbotson et al., "Comparison of XeF2 and F-atom reactions with Si and SiO2," Applied Physics Letters, vol. 44, No. 12, pp. 1129-1131 (Jun. 1984).

Jackson "Classical Electrodynamics," John Wiley & Sons Inc., pp. 568-573, date unknown.

Jerman et al., "A Miniature Fabry-Perot Interferometer with a Corrugated Silicon Diaphragm Support," (1988).

Joannopoulos et al., "Photonic Crystals: Molding the Flow of Light," Princeton University Press (1995).

Johnson, "Optical Scanners," Microwave Scanning Antennas, vol. 1, p. 251-261, (1964).

Kim et al., "Control of Optical Transmission Through Metals Perforated With Subwavelength Hole Arrays," Optic Letters, vol. 24, No. 4, pp. 256-257, (Feb. 1999).

Lee et al., "Electrostatic Actuation of Surface/Bulk Micromachined Single-Crystal Silicon Microresonators", International Conference on Intelligent Robots and Systems, vol. 2, pp. 1057-1062, (Oct. 17-21, 1999).

Lee et al., "The Surface/Bulk Micromachining (SBM) Process: A New Method for Fabricating Released MEMS in Single Crystal Silicon", Journal of Microelectromechanical Systems, vol. 8, Issue 4, pp. 409-416, (Dec. 1999).

Light over Matter, Circle No. 36 (Jun. 1993).

Lin et al., "Free-Space Micromachined Optical Switches for Optical Networking," IEEE Journal of Selected Topics in Quantum Electronics, vol. 5, No. 1, pp. 4-9. (Jan./Feb. 1999).

Little et al., "Vertically Coupled Microring Resonator Channel Dropping Filter," IEEE Photonics Technology Letters, vol. 11, No. 2, (1999).

Magel, "Integrated Optic Devices Using Micromachined Metal Membranes," SPIE vol. 2686, 0-8194-2060-Mar. (1996).

Miles, Mark, W., "A New Reflective FPD Technology Using Interferometric Modulation," The Proceedings of the Society for Information Display (May 11-16, 1997).

Nagami et al., "Plastic Cell Architecture: Towards Reconfigurable Computing For General-Purpose," IEEE, 0-8186-8900-, pp. 68-77, (May 1998).

Newsbreaks, "Quantum-trench devices might operate at terahertz frequencies," Laser Focus World (May 1993).

Oliner et al., "Radiating Elements and Mutual Coupling," Microwave Scanning Antennas, vol. 2, pp. 131-141, (1966).

PCT/US02/13442, Search Report Sep. 13, 2002.

PCT/US04/20330 Search Report Nov. 8, 2004.

PCT/US05/029821 International Search Report (Dec. 27, 2005).

PCT/US05/030927 International Search Report (0125/2006).

PCT/US05/031693 International Search Report.

PCT/US05/032331 International Search Report (Apr. 7, 2006).

PCT/US05/033558 Partial International Search Report (Feb. 24, 2006).

PCT/US2004/035820 International Search Report and Written Opinion (Nov. 4, 2005).

PCT/US96/17731 Search Report.

Raley et al., "A Fabry-Perot Microinterferometer for Visible Wavelengths," IEEE Solid-State Sensor and Actuator Workshop, Jun. 1992, Hilton Head, SC.

Schnakenberg et al., "TMAHW Etchants for Silicon Micromachining," 1991 International Conference on Solid State Sensors and Actuators-Digest of Technical Papers, pp. 815-818 (1991).

Sperger et al., "High Performance Patterned All-Dielectric Interference Colour Filter for Display Applications," SID Digest, pp. 81-83, (1994).

Sridharan et al. "Post-Packaging Release a New Concept for Surface-Micromachined Devices" Technical Digest, IEEE Solid-State Sensor & Actuator Workshop, New York, NY, US, Nov. 8, 1998, pp. 225-228, XP000992464.

Stone, "Radiation and Optics, An Introduction to the Classical Theory," McGraw-Hill, pp. 340-343, (1963).

Walker et al., "Electron-beam-tunable Interference Filter Spatial Light Modulator," Optics Letters vol.13, No. 5, pp. 345-347, (May 1988).

Williams et al., "Etch Rates for Micromachining Processing," Journal of Microelectromechanical Systems, vol. 5, No. 4, pp. 256-259 (Dec. 1996).

Winters et al., "The etching of silicon with XeF2 vapor. Applied Physics Letters," vol. 34, No. 1, pp. 70-73 (Jan. 1979).

Winton, "A novel way to capture solar energy," Chemical Week, (May 1985).

Wu, "Design of a Reflective Color LCD Using Optical Interference Reflectors," ASIA Display '95, pp. 929-931, (Oct. 1995).

Zhou et al., "Waveguide Panel Display Using Electromechanical Spatial Modulators" SID Digest, vol. XXIX, (1998).

\* cited by examiner

|  | Column Output Signals | |
|---|---|---|
|  | $+V_{bias}$ | $-V_{bias}$ |
| Row Output Signals   0 | Stable | Stable |
| $+\Delta V$ | Relax | Actuate |
| $-\Delta V$ | Actuate | Relax |

US 7,161,730 B2

SYSTEM AND METHOD FOR PROVIDING THERMAL COMPENSATION FOR AN INTERFEROMETRIC MODULATOR DISPLAY

CROSS-REFERENCE TO RELATED APPLICATIONS

This application claims the benefit of U.S. Provisional Patent Application No. 60/613,610, filed Sep. 27, 2004, and titled SYSTEM AND METHOD FOR PROVIDING THERMAL COMPENSATION FOR AN INTERFEROMETRIC MODULATOR DISPLAY, which is incorporated in its entirety by reference herein.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages that include, for example, an interferometric modulator employing a thermal compensation film to increase tensile stress in the movable layer of the interferometric modulator due to the mismatch in rate of expansion of the substrate and the movable layer.

An embodiment provides an interferometric modulator comprising a first electrode and a flexible second electrode situated on a substrate. The flexible second electrode is a movable layer that can comprise aluminum or an aluminum-containing material, while the substrate can comprise glass. When the interferometric modulator undergoes a temperature change, the difference in thermal expansion rates for the movable layer and the substrate results in a decrease in tensile strain on the movable layer. Such strain can weaken or damage the movable layer, leading to failure of the movable layer to actuate upon application of a voltage across the electrodes. Accordingly, a method for compensating for differences in thermal expansion is desirable for reducing strain on the movable layer and avoiding premature failure of the interferometric modulator.

In certain embodiments, a system for thermal compensation of a microelectromechanical system (MEMS) device comprises a substrate characterized by a first thermal expansion coefficient. The system further comprises a member coupled to the substrate and a movable layer characterized by a second thermal expansion coefficient and coupled to the member. The system further comprises a film located proximate to the substrate and having a third thermal expansion coefficient less than the first thermal expansion coefficient, wherein the film is configured to compensate for expansion of the movable layer with respect to the substrate when the MEMS device is exposed to thermal energy.

In certain embodiments, a light modulator comprises a substrate, a first electrode layer over the substrate, and a second electrode layer over the substrate. The light modulator further comprises a support coupling the substrate to the second electrode layer and forming a cavity between the first electrode layer and the second electrode layer, a reflective surface substantially parallel to the first electrode layer and coupled to the second electrode layer, and a film configured to induce tensile stress in the second electrode layer in response to increased temperature.

In certain embodiments, an array of light modulators arranged at intersections of rows and columns of electrodes comprises a substrate, a first electrode layer over the substrate, and a second electrode layer over the substrate. The array further comprises at least one support connecting the substrate to the second electrode layer and forming a plurality of cavities between the first electrode layer and the second electrode layer and a plurality of reflective surfaces substantially parallel to the first electrode layer and coupled to the second electrode layer. The array further comprises a film configured to induce tensile stress in the second electrode layer in response to increased temperature of the array.

In certain embodiments, a method for thermally compensating a light modulator comprises providing a substrate, providing a first electrode layer over the substrate, and providing a second electrode layer over the substrate. The method further comprises providing a support connecting the substrate to the second electrode layer, providing a reflective surface substantially parallel to the first electrode layer and coupled to the second electrode layer, the reflective surface movable along a direction substantially perpendicular to the reflective surface. The method further comprises bowing the substrate so as to induce tensile stress in the second electrode layer.

In certain embodiments, a method balances thermal coefficients to maintain tension in an interferometric modulator having a substrate and a movable layer separated by a cavity, the cavity being configured to cause interference between at least two wavelengths of electromagnetic radiation. The method comprises selecting a material having a first coefficient of thermal expansion for a substrate, selecting a material having a second coefficient of thermal expansion for a movable layer, and selecting a film based at least in part on a comparison of the first coefficient of thermal expansion and the second coefficient of thermal expansion so as to maintain tension in the movable layer.

In certain embodiments, a method balances thermal coefficients to maintain tension in a MEMS device having a substrate and a movable layer separated by a cavity. The method comprises selecting a material for a movable layer of a MEMS device, the material configured to be in tension A at a first temperature and in tension B at a second temperature when suspended between support strucures of the MEMS device, wherein the tension B is less than the tension A and selecting a material for a second layer of the MEMS device, the material having a coefficient of thermal expansion that maintains the movable layer at the tension A when the movable layer is at the second temperature.

These and other embodiments are described in greater detail below.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Embodiments of the present invention provide a film configured to compensate for thermal expansion of an MEMS device. The film is located proximate to the substrate and has a thermal expansion coefficient less than the substrate so as to compensate for expansion of the movable reflective layer with respect to the substrate when the MEMS is exposed to thermal energy. The film compensates for mismatch in thermal expansion between the materials of the substrate and reflective layer so as to inhibit undesirable optical characteristics, such as shifting of the actuation and release voltages, from occurring when the MEMS is exposed to thermal energy and maintain proper electromechanical behavior.

Figure 1:
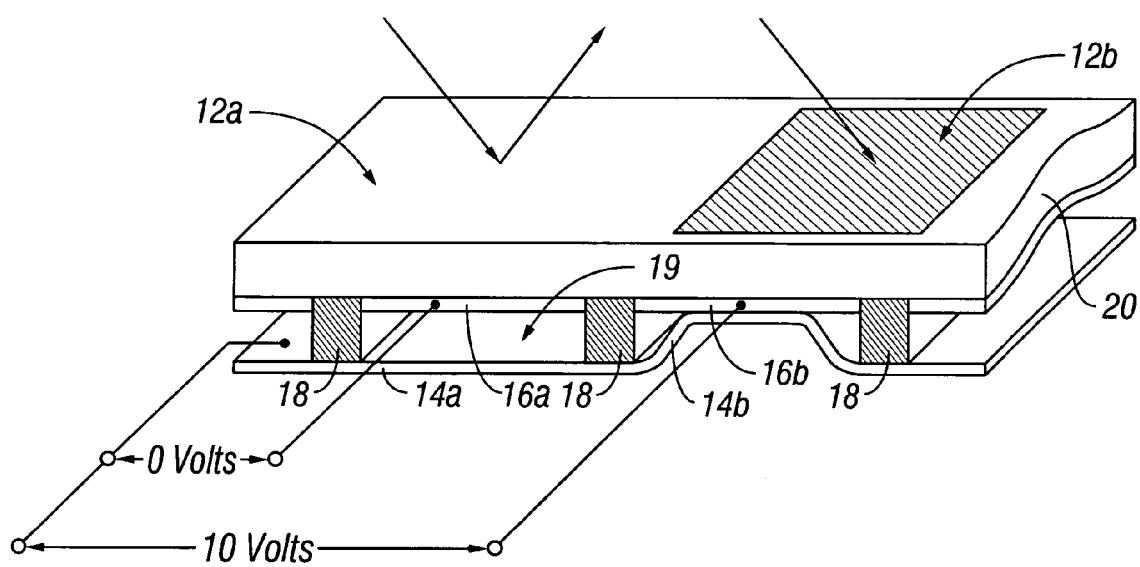
FIG. 1 is an isometric view depicting a portion of one embodiment of an interferometric modulator display in which a movable layer of a first interferometric modulator is in a relaxed position and a movable layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Other material that may be used for the movable layer 14 includes Ni and Cr.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
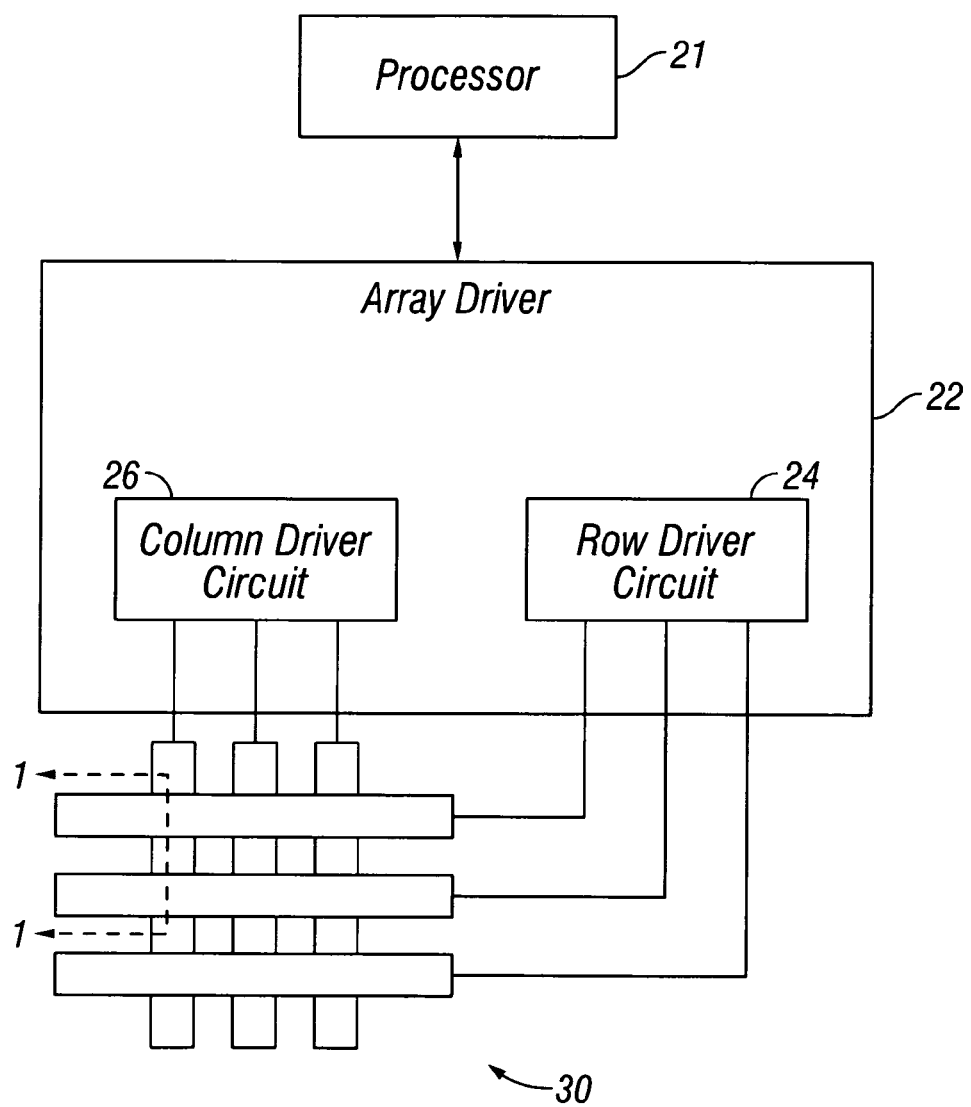
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1—1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3–7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
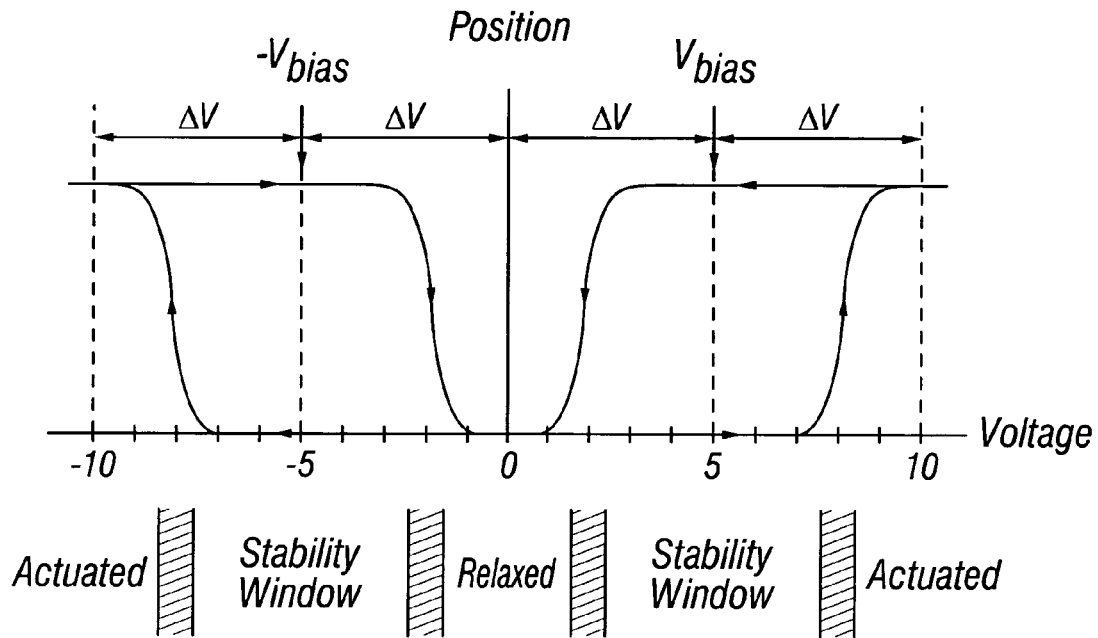
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
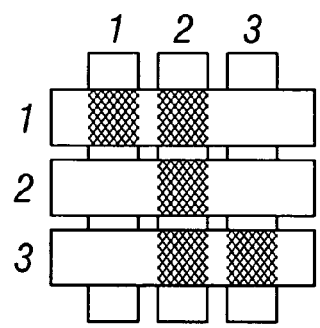
FIGS. 5A and 5B illustrate one exemplary timing diagram for row and column signals that may be used to write a frame of display data to the 3×3 interferometric modulator display of FIG. 2.
Figure 5B:
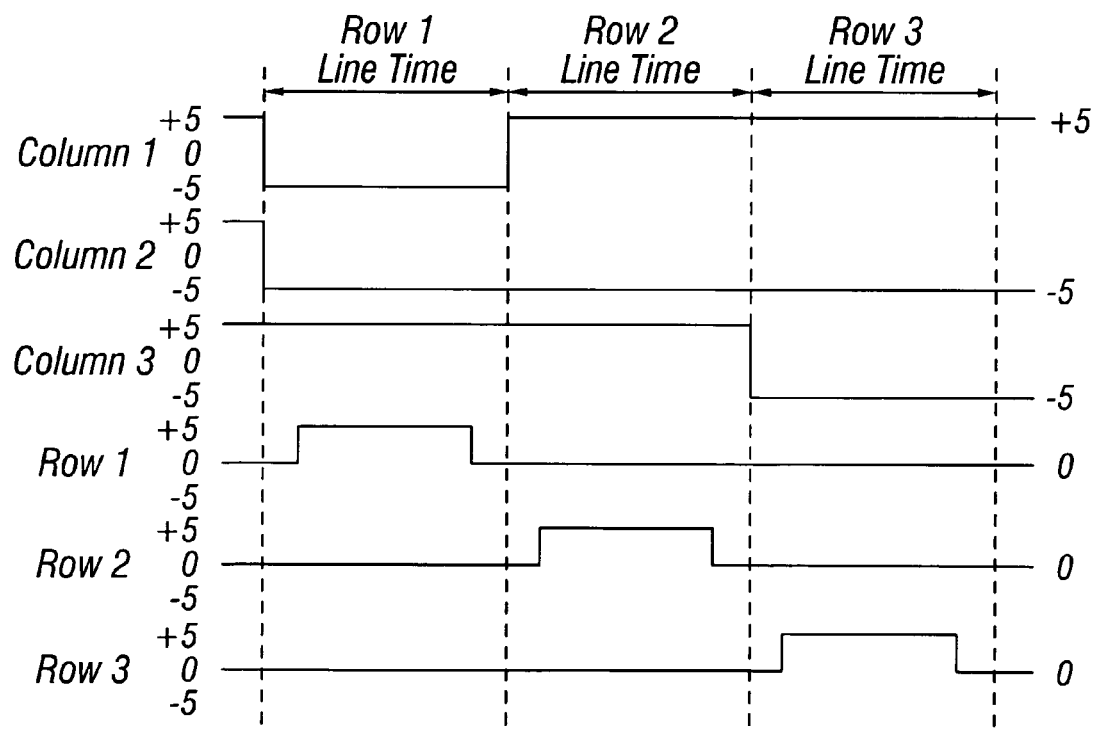

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3–7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
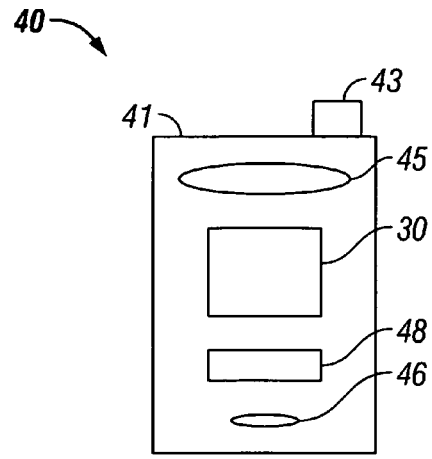
FIGS. 6A and 6B are system block diagrams illustrating an embodiment of a visual display device comprising a plurality of interferometric modulators.
Figure 6B:
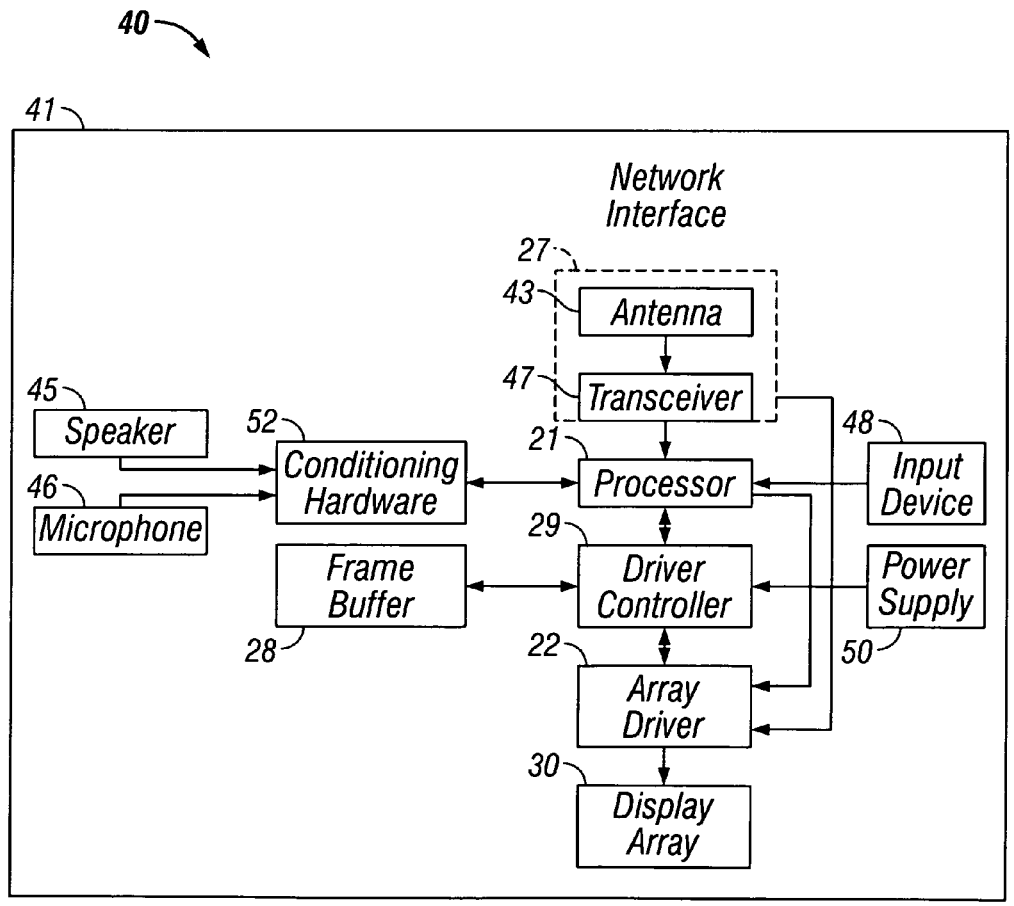

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, the network interface 27 can be replaced by an image source, which can store or generate image data to be sent to the processor 21. For example, the image source can be a digital video disc (DVD) or a hard-disc drive that contains image data, or a software module that generates image data.

The processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to the frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, the driver controller 29 is a conventional display controller or a bi-stable display controller (e.g., an interferometric modulator controller). In another embodiment, the array driver 22 is a conventional driver or a bi-stable display driver (e.g., an interferometric modulator display). In one embodiment, the driver controller 29 is integrated with the array driver 22. Such an embodiment is common in highly integrated systems such as cellular phones, watches, and other small area displays. In yet another embodiment, the display array 30 is a typical display array or a bi-stable display array (e.g., a display including an array of interferometric modulators).

The input device 48 allows a user to control the operation of the exemplary display device 40. In one embodiment, the input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

The power supply 50 can include a variety of energy storage devices as are well known in the art. For example, in one embodiment, the power supply 50 is a rechargeable battery, such as a nickel-cadmium battery or a lithium ion battery. In another embodiment, the power supply 50 is a renewable energy source, a capacitor, or a solar cell, including a plastic solar cell, and solar-cell paint. In another embodiment, the power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
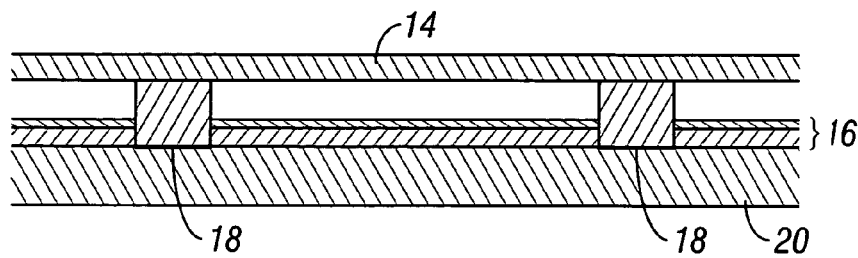
FIG. 7A is a cross section of the device of FIG. 1.
Figure 7B:
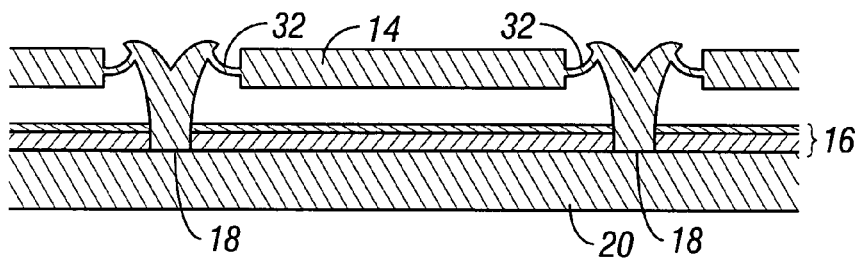
FIG. 7B is a cross section of an alternative embodiment of an interferometric modulator.
Figure 7C:
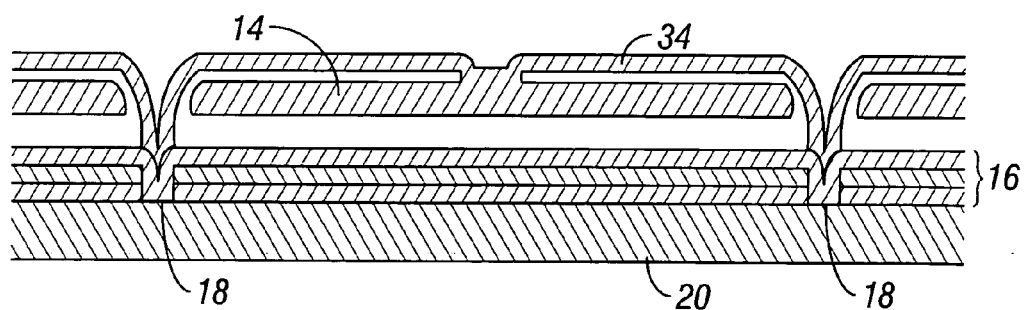
FIG. 7C is a cross section of another alternative embodiment of an interferometric modulator.
Figure 7D:
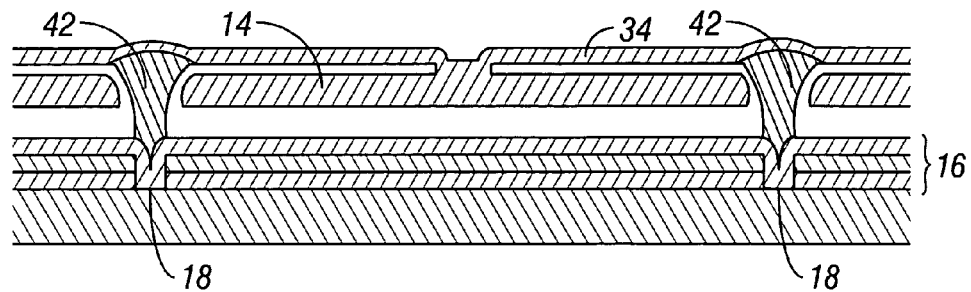
FIG. 7D is a cross section of yet another alternative embodiment of an interferometric modulator.
Figure 7E:
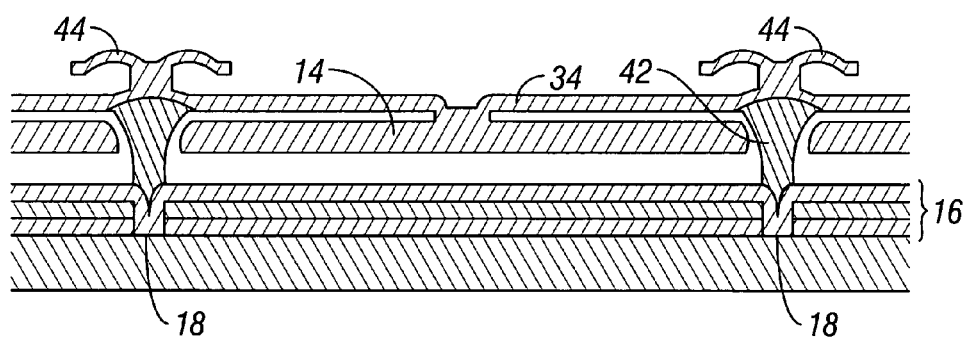
FIG. 7E is a cross section of an additional alternative embodiment of an interferometric modulator.

The details of the structure of interferometric modulators that operate in accordance with the principles set forth above may vary widely. For example, FIGS. 7A–7E illustrate five different embodiments of the movable reflective layer 14 and its supporting structures. FIG. 7A is a cross section of the embodiment of FIG. 1, where a strip of metal material 14 is deposited on orthogonally extending supports or posts 18. In FIG. 7B, the moveable reflective layer 14 is attached to the supports 18 at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support structures or posts 18. The embodiment illustrated in FIG. 7D has support post plugs 42 upon which the deformable layer 34 rests. The movable reflective layer 14 remains suspended over the cavity, as in FIGS. 7A–7C, but the deformable layer 34 does not form the support posts 18 by filling holes between the deformable layer 34 and the optical stack 16. Rather, the support posts 18 include planarization material, which is used to form support post plugs 42. The embodiment illustrated in FIG. 7E is based on the embodiment shown in FIG. 7D, but may also be adapted to work with any of the embodiments illustrated in FIGS. 7A–7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C–7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Referring back to FIG. 1, the movable layer 14 is fabricated such that it is under tensile stress, and thus parallel to the transparent substrate 20, in the off state. As described above, the substrate 20 can comprise a material such as glass, silicon, plastic, Mylar, quartz, or the like. Such substrate 20 materials can undergo thermal expansion at a rate lower than that of the movable layer 14, which can comprise a metal such as aluminum. Rates of thermal expansion for a variety of materials are listed in Table 1.

TABLE 1

| Material | Rate of Expansion ($10^{-5}$ in/in/° C.) | Temperature |
|---|---|---|
| Crown Glass | 1.3–1.4 | Room temp. |
| Flint Glass | 1.5 | Room temp. |
| Pyrex | 0.3 | Room temp. |
| Aluminum & its Alloys | 2.1–2.5 | 100–390° C. |
| Silver | 2.0 | 100–390° C. |
| Cr—Ni—Fe Superalloys | 1.7–1.9 | 540–980° C. |
| Heat Resistant Alloys (cast) | 1.1–1.9 | 540–980° C. |
| Coppers | 1.4–1.8 | 100–390° C. |
| Nickel-Base Superalloys | 1.8 | 540–980° C. |
| Cobalt-Base Superalloys | 1.2–1.7 | 540–980° C. |
| Beryllium Copper | 1.7 | 100–390° C. |
| Cupro-Nickels & Nickel Silvers | 1.6–1.7 | 100–390° C. |
| Nickel & its Alloys | 1.2–1.7 | 540–980° C. |
| Cr—Ni—Co—Fe Superalloys | 1.4–1.6 | 540–980° C. |
| Gold | 1.4 | 100–390° C. |
| Titanium & its Alloys | 0.9–1.3 | 540–980° C. |
| Cobalt | 1.2 | 540–980° C. |
| Palladium | 1.2 | 100–390° C. |
| Beryllium | 1.1 | Room temp. |
| Thorium | 1.1 | Room temp. |
| Beryllium Carbide | 1.0 | 540–980° C. |
| Low Expansion Nickel Alloys | 0.3–1.0 | 100–390° C. |
| Molybdenum Disilicide | 0.9 | 100–390° C. |
| Ruthenium | 0.9 | Room temp. |
| Platinum | 0.9 | 100–390° C. |
| Vanadium | 0.9 | Room temp. |
| Rhodium | 0.8 | Room temp. |
| Tantalum Carbide | 0.8 | 540–980° C. |
| Boron Nitride | 0.8 | 540–980° C. |
| Titanium Carbide | 0.7 | 540–980° C. |
| Iridium | 0.7 | Room temp. |
| Zirconium Carbide | 0.7 | 540–980° C. |
| Osmium and Tantalum | 0.6 | Room temp. |
| Zirconium & its Alloys | 0.6 | Room temp. |
| Hafnium | 0.6 | Room temp. |
| Zirconia | 0.6 | 1205–1580° C. |
| Molybdenum & its Alloys | 0.5–0.6 | Room temp. |
| Silicon Carbide | 0.39–.4 | 1205–1580° C. |
| Tungsten | 0.4 | Room temp. |
| Electrical Ceramics | 0.4 | 100–390° C. |
| Zircon | 0.2–0.3 | 100–390° C. |
| Boron Carbide | 0.3 | 1205–1580° C. |
| Carbon and Graphite | 0.2–0.3 | 100–390° C. |

Mismatch in thermal expansion between the substrate 20 and the movable layer 14 can result in increased or reduced tensile stress in the movable layer 14. The increased or reduced tensile stress may change the operational characteristics of the MEMS device as the MEMS device is exposed to thermal energy. To compensate for mismatch in thermal expansion, a thermal compensation film is employed.

Interferometric modulator arrays rely on tensile stress in the movable layer 14 to maintain mechanical rigidity, whereby proper electromechanical behavior for the interferometric modulator is maintained. All materials change dimension with temperature changes, including the dominant material layers in the interferometric modulator, the glass substrate 20 and the movable layer 14. As temperature increases over the range typically experienced by an interferometric modulator in a device, the stress induced by the difference in thermal expansion coefficient between the substrate 20 and the movable layer 14 can have a substantial impact on the electromechanical behavior of the interferometric modulator. The effect can manifest itself in a shift in actuation and release voltage for the interferometric modulator.

While the glass substrate 20 can expand as temperature rises, the thermal expansion coefficient of the movable layer 14 can be larger. Additionally, the movable layer 14 is not free to expand laterally, resulting in an increase in compressive stress as the temperature rises. This compressive stress reduces the tensile stress designed into the movable layer 14, changing the interferometric modulator performance. To counteract this effect, a thermal compensation film is preferably added to the interferometric modulator. In certain embodiments, the thermal compensation film may be positioned below the substrate 20, above the substrate 20, or embedded within the substrate 20. For example, the thermal compensation film may positioned above the cavity 19 and adjacent to the movable layer 14.

In certain embodiments, the thermal compensation film comprises a material exhibiting low, zero, or negative thermal expansion. Use of such materials facilitates control of thermal expansion and can allow the design of materials with a specific thermal expansion anywhere between the values of the pure components of the composite. Matching the thermal expansion of device parts can also be desirable to avoid cracks or separation at interfaces between two components, and minimal expansion is desirable when electronic or optical components in a device are to be positioned exactly.

A film having a negative coefficient of thermal expansion contracts as temperature increases. In certain embodiments, a negative coefficient film is employed to "bow" the substrate 20, increasing the tensile stress in the mechanical film attached to the substrate 20 through the posts 18.

Figure 8:
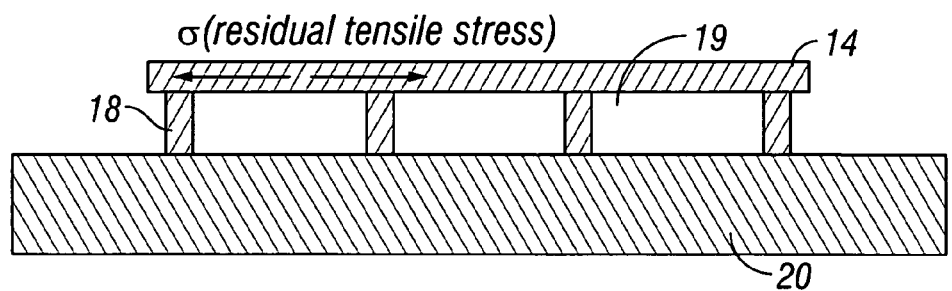
FIG. 8 schematically illustrates an interferometric modulator array including a movable layer with intentionally designed tensile strength $\sigma_t$.

FIG. 8 depicts an interferometric modulator array in cross-section at a design temperature. The interferometric modulator array includes a movable layer 14 with an intentionally designed tensile stress $\sigma_i$. As temperature increases, the substrate 20 and movable layer 14 expand. However, the thermal expansion coefficient of the movable layer 14 is greater than that of the substrate 20. Because the movable layer 14 is anchored at the supports or posts 18, the movable layer 14 between the posts 18 expands and effectively reduces the tensile stress. Also depicted in FIG. 8 are cavities 19.

Figure 9:
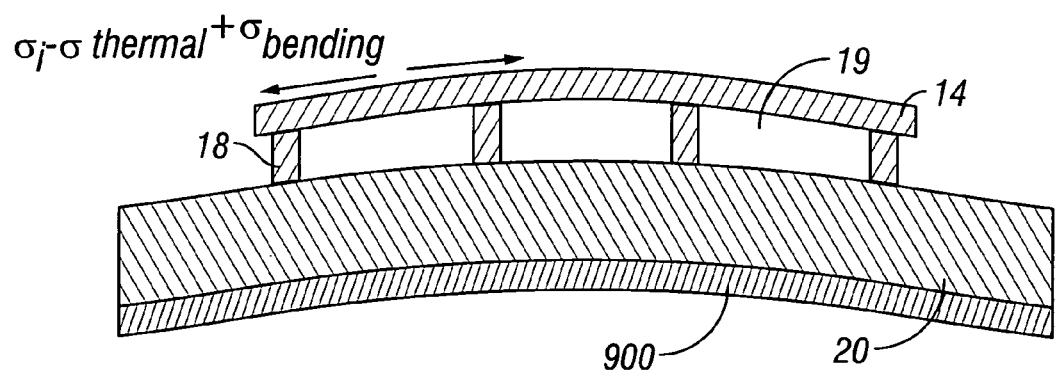
FIG. 9 schematically illustrates the interferometric modulator array including a movable layer with intentionally designed tensile strength $\sigma_t$, and further including a thermal compensation film deposited on the substrate.

This effect can be compensated for by depositing a thermal compensation film 900 on the substrate 20, as illustrated in FIG. 9. The thermal compensation film 900 may have a low or negative coefficient of thermal expansion. As the temperature increases, the thermal compensation film 900 expands less than the substrate 20 expands, slightly bending the substrate 20 and imparting a tensile stress to the movable layer 14. Embodiments having a thermal compensation film 900 with a negative coefficient of thermal expansion (NTE) contract as the temperature increases, slightly bending the substrate 20 and imparting a tensile stress to the movable layer 14. This counteracts the reduction in stress in the movable layer 14 caused by its thermal expansion. Also depicted in FIG. 9 are cavities 19 and support structures or posts 18.

Thermal expansion of the thermal compensation film 900 and substrate 20 creates a strain at the interface, resulting in stress in the substrate and the thermal compensation film 900. The stress in the substrate 20 can be estimated by Equation 1:

$$\sigma_F = (E_F/(1-\nu_F))(\alpha_S - \alpha_{NTE})(T-300) \qquad \text{EQUATION 1}$$

wherein $\sigma_f$ is the stress in the thermal compensation film 900 at the interface, Ef is the elastic modulus of the thermal compensation film 900, $\nu_f$ is the Poisson ratio of the film, $\alpha$ is the thermal expansion coefficient, and T is temperature (K). Table 2 lists values for an exemplary material, Corning 1737F which is available from Corning located in Corning, N.Y. These values can be used to calculate the temperature induced tensile stress as a function of temperature for the exemplary material. This can be inserted into well known expression for estimating how much the substrate 20 will be curved by the induced stress, the Stoney equation.

$$\rho = \frac{\overline{E}_s h_s^2}{6\sigma_m h_f},$$

where $\rho$ is the radius of curvature, $\overline{E}_s$ is the biaxial modulus of the substrate, $h_s$ and $h_f$ are the substrate and film thickness, and $\sigma_m$ is the stress at the interface.

Figure 10:
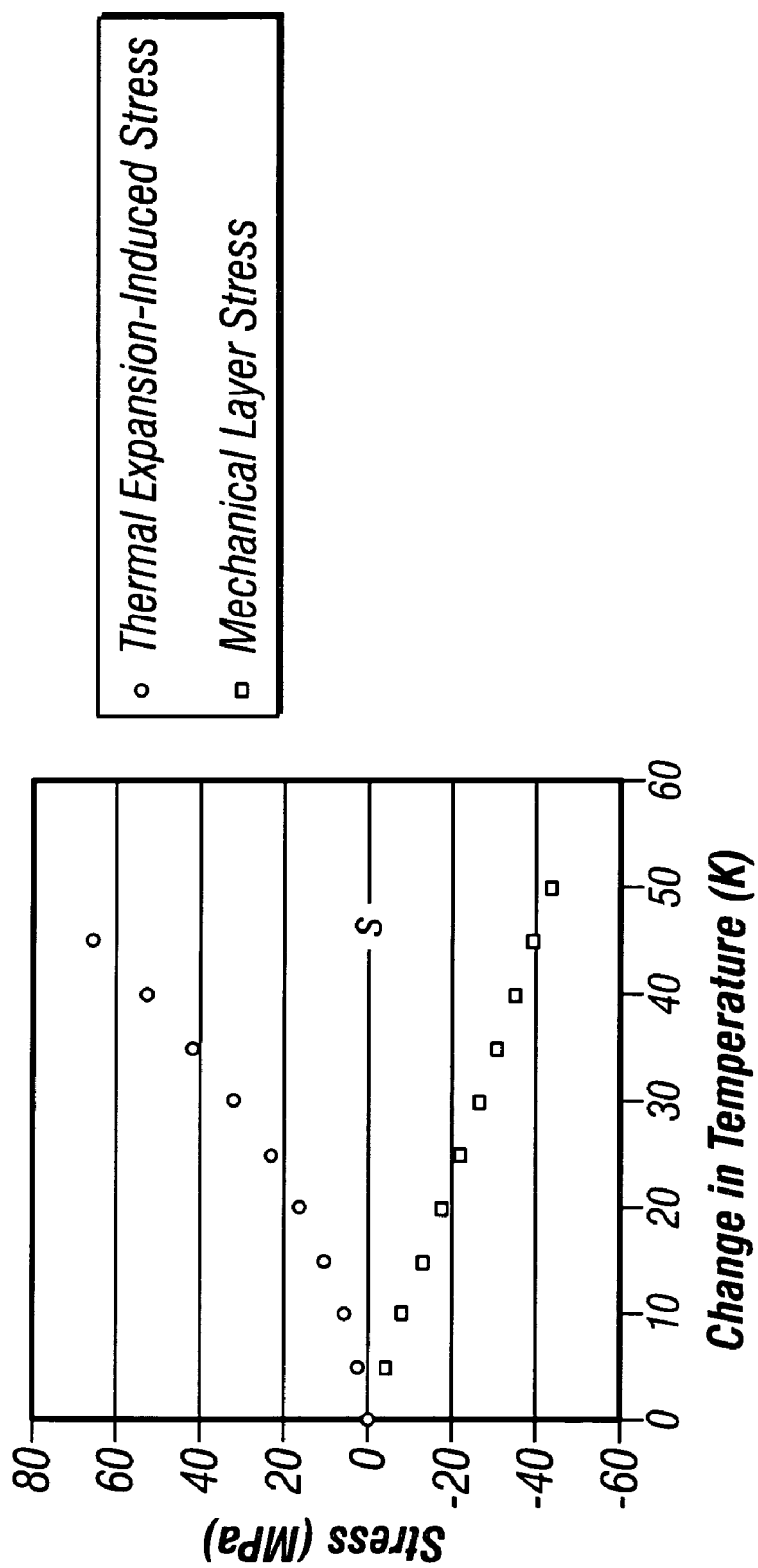
FIG. 10 provides a graph depicting the stress change as a function of temperature due to the thermal compensation film and due to thermal expansion of the substrate.

This bending exerts a tensile stress on the movable layer 14, compensating for thermal expansion mismatch between the movable layer 14 and the substrate 20. The opposing stress versus temperature curves are plotted in FIG. 10.

TABLE 2

| Symbol | Definition | Value | Units |
| --- | --- | --- | --- |
| $\sigma_f$ | Stress in the substrate | — | Pa |
| Es | Elastic modulus of the substrate | 7.09E+10 | Pa |
| $\nu_f$ | Poisson ratio of the film | 0.24 | — |
| $\alpha$ | Thermal expansion coefficient (Corning 1737F) | 3.76E−06 | 1/K |
| T | Temperature (K) | — | K |

In embodiments wherein the movable layer 14 has a higher thermal expansion than the substrate 20, a low, zero, or negative thermal compensation film 900 can form a layer on at least a portion of the top and/or bottom exposed surfaces of the movable layer 14. The thermal compensation film 900, having a lower thermal expansion than that of the movable layer 14, compensates for the movable layer's higher thermal expansion. The thermal compensation film 900 can be selected to provide sufficient thermal expansion compensation to the movable layer 14 such that the movable layer 14 and the substrate 20 exhibit the same, or similar, thermal expansion, thereby minimizing or eliminating tensile strain in the movable layer 14.

Materials with low thermal expansion suitable for use include Invar, lithium aluminum silicates (LAS), and the $NaZr_2P_3O_{12}$ (NZP) family of materials. Suitable materials fore the thermal compensation film 900 include negative thermal expansion (NTE) materials. Suitable NTE materials can undergo isotropic and/or linear negative expansion over a large temperature range including room temperature, can be derived from cheap, commercially available precursors, and are easy to prepare. Thermodynamic stability over a large temperature and pressure range are also desirable characteristics. The thermal compensation film 900 also preferably does not undergo phase transitions at low pressures. Examples of suitable thermal compensation films 900 include the $Sc_2W_3O_{12}$ family, the $ZrV_2O_7$ family, and the $ZrW_2O_8$ family of materials. For example, $ZrW_2O_8$ exhibits isotropic contraction over a wide range of temperatures, and has been employed to prevent the expansion of optical fiber gratings. $ZrW_2O_8$ based films are described in detail by M. S. Sutton in *Journal of Microelectromechanical Systems*, Vol. 13, No. 4, August 2004, the contents of which are hereby incorporated herein by reference in their entirety and are hereby made a part of this specification.

Additional examples of isotropic materials for use as the thermal compensation film 900 (i.e., materials that contract or expand the same in all dimensions upon experiencing a change in temperature) with low or negative coefficients of thermal expansion include $ZrP_2O_7$. $ZrP_2O_7$ shows normal thermal expansion up to about 290° C. at which the phase transition occurs, and very low and positive thermal expansion above 290° C. $A_2(MO_4)_3$ phases can also exhibit negative thermal expansion, e.g., $Sc_2(WO_4)_3$, which shows a bulk volume contraction from 10 K to at least 800 K.

The thermal compensation film 900 may be at least partially transparent or at least partially opaque. For interferometric modulators that are viewed through the thermal compensation film 900, the film is preferably at least partially transparent. For example, thermal compensation films 900 having a negative coefficient of thermal expansion include glass ceramics. Glass ceramics are commercially available from Ohara Corporation of Rancho Santa Margarita, Calif. These materials decrease in length and volume as temperature increases and expand when cooled. One of these materials, NEX-I, exhibits a coefficient of thermal expansion CTE PPM/° C. (−40° C. to 80° C.) of −76, a modulus of elasticity of 27 GPa, a Poisson ration of 0.14, and a Specific Gravity (g/cc) of 2.38. The NEX-C material exhibits a coefficient of thermal expansion CTE PPM/° C. (−40° C. to 80° C.) of −20, a modulus of elasticity of 94 GPa, a Poisson ration of 0.2, a Vickers hardness of 280, a Specific Gravity (g/cc) of 2.57, and a high internal transmittance at 1570 nm of 99.3% (thickness 10 mm). These glass ceramics are marketed in sizes of up to 100×60×20 mm, making them suitable for use in interferometric modulators of sizes suitable for use in various displays.

In one embodiment, the thermal compensation film 900 functions to eliminate, or minimize, any differential in thermal expansion of the movable layer 14 and the substrate 20, such that changes in temperature do not result in reduced tensile stress in the movable layer 14 due to differences in expansion rates of the movable layer 14 and the substrate 20. The thermal compensation film 900 can be selected to control the expansion of the substrate 20 such that the stress the substrate 20 imparts to the movable layer 14 maintains the tensile stress of the movable layer 14.

The thermal compensation film 900 for modification of thermal expansion of the substrate 20 can be of any suitable configuration. The configuration of the interferometric modulator can affect the configuration of the thermal compensation film 900.

Figure 11A:
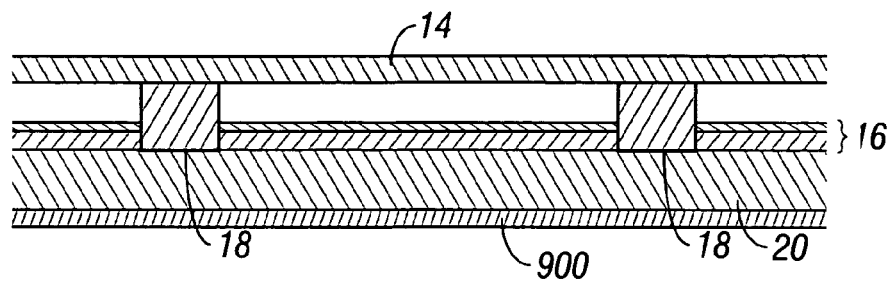
FIG. 11A is a cross section of the device of FIG. 1 incorporating a thermal compensation film.
Figure 11B:
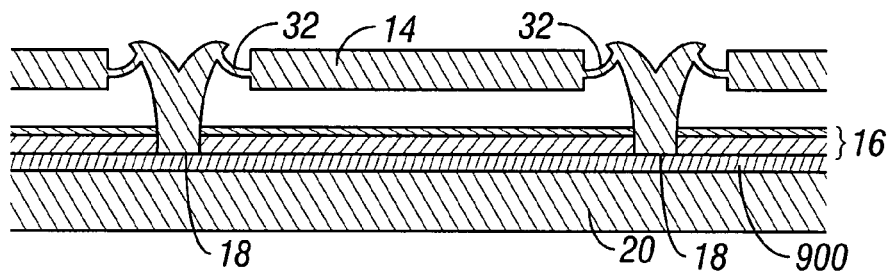
FIG. 11B is a cross section of an alternative embodiment of an interferometric modulator incorporating a thermal compensation film.
Figure 11C:
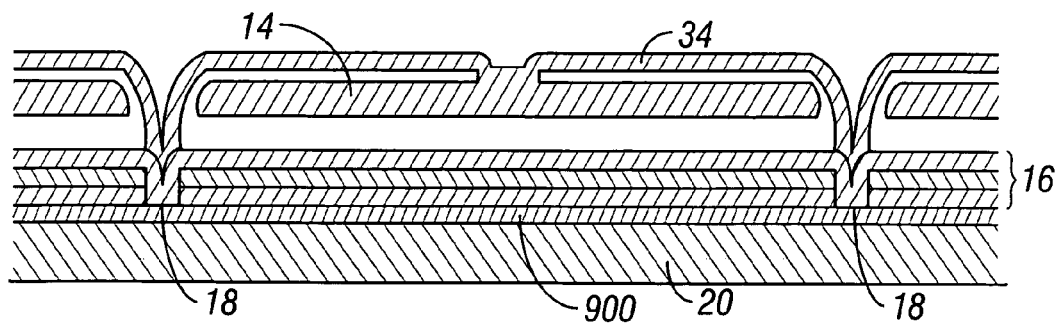
FIG. 11C is a cross section of another alternative embodiment of an interferometric modulator incorporating a thermal compensation film.
Figure 11D:
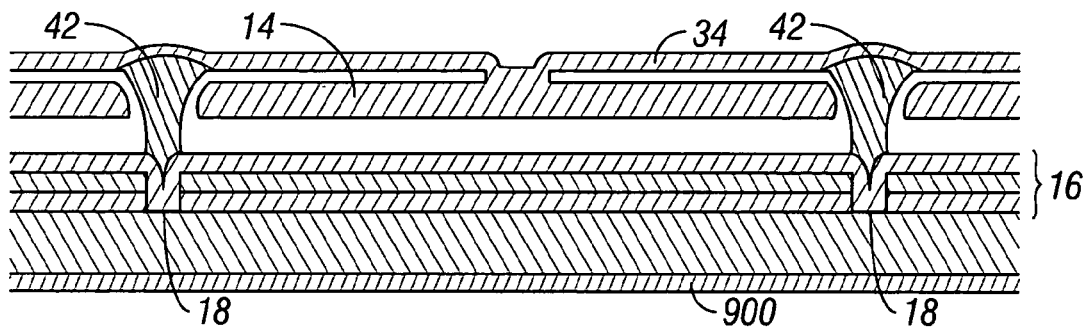
FIG. 11D is a cross section of yet another alternative embodiment of an interferometric modulator incorporating a thermal compensation film.
Figure 11E:
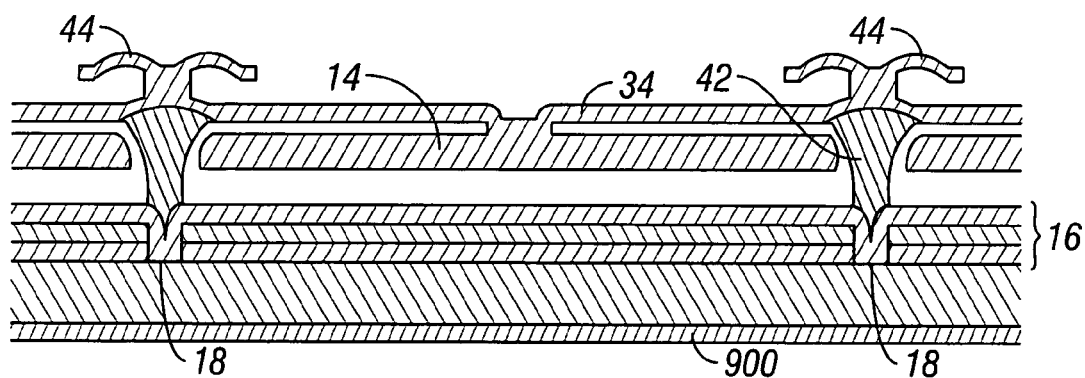
FIG. 11E is a cross section of an additional alternative embodiment of an interferometric modulator incorporating a thermal compensation film.

FIG. 11A is a cross section of the device of FIG. 1 incorporating a thermal compensation film 900 below the substrate 20. FIG. 11B is a cross section of an alternative embodiment of an interferometric modulator incorporating a thermal compensation film 900a above the substrate 20 and below the optical stack 16. FIG. 11C is a cross section of another alternative embodiment of an interferometric modulator incorporating a thermal compensation film 900 above the substrate 20 and below the optical stack 16. FIG. 11D is a cross section of yet another alternative embodiment of an interferometric modulator incorporating a thermal compensation film 900 below the substrate 20. FIG. 11E is a cross section of an additional alternative embodiment of an interferometric modulator incorporating a thermal compensation film 900 below the substrate 20. In variations of these embodiments, the thermal compensation film 900 is positioned above the substrate 20 or embedded within the substrate 20. For example, the thermal compensation film may positioned above the cavity 19 and adjacent to the movable layer 14.

In FIGS. 11A through 11E, the interferometric modulator includes a glass substrate 20, a thin indium-tin-oxide (ITO) layer and chromium layer as part of the optical stack 16, and a movable layer 14. In operation, the cavities 19 of the interferometric modulator are designed to be viewed through the glass substrate 20 into the deposited layers. Because the device display is viewed through the substrate 20, the thermal compensation film 900 is configured so as not to block the view of the underlying cavities 19. For example, the thermal compensation film 900 may be transparent, mesh, or frame around the array. In interferometric modulators of such configuration (including the device of FIG. 11A), a thermal compensation film 900 comprises a layer of a thermal expansion compensating material covering the viewing area of the interferometric modulator and affixed below the substrate 20, as depicted in FIGS. 11A through 11E.

Alternatively, the thermal compensation film 900 can be in the form of a mesh, grid, or perforated sheet affixed, bonded, or deposited atop the substrate 20, or incorporated into the substrate 20 layer itself. If the thermal compensation film 900 is optically transparent, then it can, e.g., be employed as the substrate 20 itself, it can be combined with another material to form a composite substrate 20 of the desired thermal expansion characteristics, or it can be affixed, deposited on, or bonded to the substrate 20 to form a structure with the desired thermal expansion characteristics.

Figure 12:
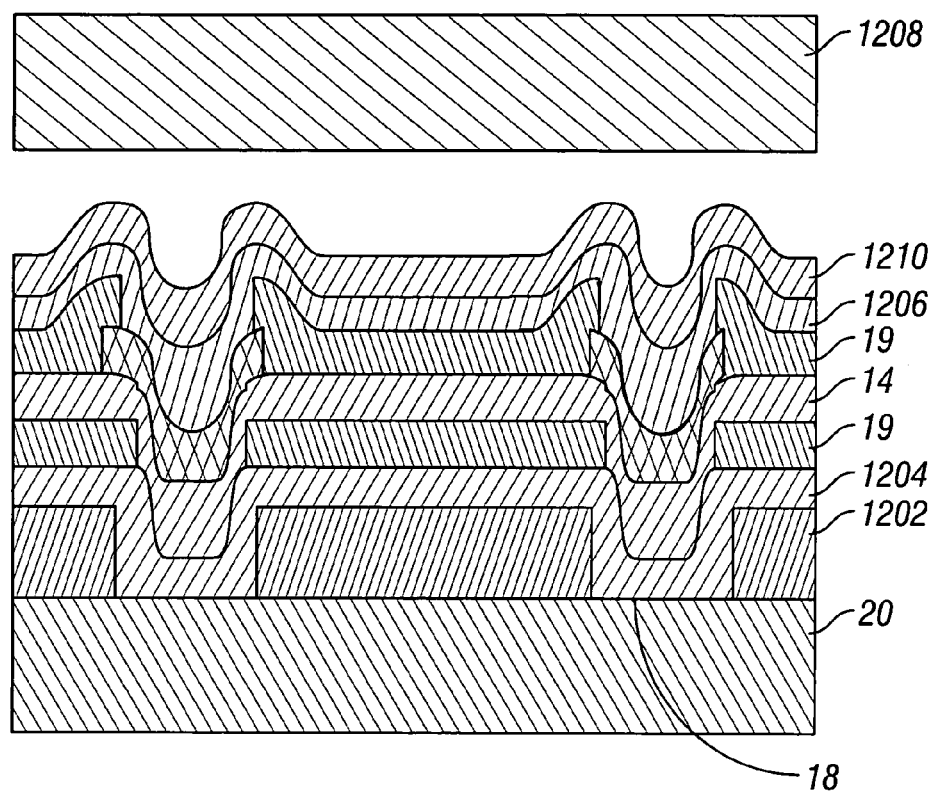
FIG. 12 schematically illustrates an interferometric modulator including a thick chromium layer deposited on a glass substrate as the first electrode, and an aluminum layer as the flexible second electrode.

Referring now to FIG. 12, an interferometric modulator of another embodiment is depicted schematically in cross section. The interferometric modulator includes a glass substrate 20, a thick chromium layer 1202, an insulating layer 1204, a movable layer 14, a second thin chromium optical layer 1206, and a transparent electrode layer, for example, indium tin oxide (ITO) 1210. In operation, the optical cavities 19 of the interferometric modulator are designed to be viewed through a transparent protective layer 1208 into the deposited layers rather than through the glass substrate 20. As the movable layer 14 moves up or down, the cavity 19 changes which changes the interferometric modulator's interferometric properties. For example, the movable layer 14 can move in a binary mode between a first or relaxed position and an actuated position. Incident light that reflects from the interferometric modulator interferes constructively or destructively depending on the position of the movable layer 14, producing either an overall reflective or non-reflective state for the interferometric modulator.

Because the optical cavities 19 are not viewed through the substrate 20 in the interferometric modulator depicted in FIG. 12, greater flexibility of design of the thermal compensation film 900 for use with the substrate 20 is possible. For example, a non-transparent material of a tailored thermal expansion matching that of the movable layer 14 can be employed as the substrate 20 of the interferometric modulator. Such materials can comprise a composite of two (or more) materials having thermal expansions much less than that of the substrate 20 or having negative coefficients of thermal expansion.

If the thermal compensation film 900 is for use with the protective layer 1208, then viewing considerations as described in regard to the devices of FIGS. 11A through 11E apply. However, because the bulk of the protective layer 1208 is situated above the surface of the underlying layers, including the movable layer 14, the contribution of the protective layer 1208 to tensile stress in the movable layer 14 due to differences in thermal expansion is expected to be minimal. Accordingly, thermal compensation of the protective layer 1208 may be unnecessary.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, certain embodiments may be embodied within a form that does not provide all of the features and benefits set forth herein, as some features may be used or practiced separately from others.

What is claimed is:

1. A system for thermal compensation of a microelectromechanical system (MEMS) device, the system comprising:
   a substrate characterized by a first thermal expansion coefficient;
   at least two members coupled to the substrate, the members being spaced apart by a space;
   a movable layer characterized by a second thermal expansion coefficient and coupled to the at least two members; and
   a film located proximate to the substrate and having a third thermal expansion coefficient, the film extending below and across the space between the two members,
   wherein the film is configured to compensate for expansion of the movable layer with respect to the substrate when the MEMS device is exposed to thermal energy.

2. A system for thermal compensation of a microelectromechanical system (MEMS) device, the system comprising:
   a substrate characterized by a first thermal expansion coefficient;
   a member coupled to the substrate;
   a movable layer characterized by a second thermal expansion coefficient and coupled to the member; and
   a film located proximate to the substrate and having a third thermal expansion coefficient less than the first thermal expansion coefficient,
   wherein the film is configured to compensate for expansion of the movable layer with respect to the substrate when the MEMS device is exposed to thermal energy, and wherein the film is positioned below the substrate.

3. The system of claim 1, wherein the film is embedded within the substrate.

4. The system of claim 1, further comprising a cavity located between the substrate and the movable layer and a reflective surface portion, the reflective surface portion being movable between a first position and a second position, the first position being a first distance from the substrate, the second position being a second distance from the substrate.

5. The system of claim 1, wherein the film comprises a nickel-iron alloy.

6. The system of claim 1, wherein the film comprises a lithium aluminum silicate (LAS).

7. The system of claim 1, wherein the third thermal expansion coefficient is less than the second thermal expansion coefficient.

8. The system of claim 1, wherein the film comprises a material having a low coefficient of thermal expansion.

9. A system for thermal compensation of a microelectromechanical system (MEMS) device, the system comprising:
   a substrate characterized by a first thermal expansion coefficient;
   a member coupled to the substrate;
   a movable layer characterized by a second thermal expansion coefficient and coupled to the member; and
   a film located proximate to the substrate and having a third thermal expansion coefficient less than the first thermal expansion coefficient,
   wherein the film is configured to compensate for expansion of the movable layer with respect to the substrate when the MEMS device is exposed to thermal energy, and wherein the film comprises a material having a negative coefficient of thermal expansion.

10. A system for thermal compensation of a microelectromechanical system (MEMS) device, the system comprising:
    a substrate characterized by a first thermal expansion coefficient;
    a member coupled to the substrate;
    a movable layer characterized by a second thermal expansion coefficient and coupled to the member; and
    a film located proximate to the substrate and having a third thermal expansion coefficient less than the first thermal expansion coefficient,
    wherein the film is configured to compensate for expansion of the movable layer with respect to the substrate when the MEMS device is exposed to thermal energy, and wherein the film is at least partially transparent.

11. The system of claim 1, wherein the film is at least partially opaque.

12. A light modulator comprising:
    a substrate;
    a first electrode layer over the substrate;
    a second electrode layer over the substrate;
    a support coupling the substrate to the second electrode layer and forming a cavity between the first electrode layer and the second electrode layer;
    a reflective surface substantially parallel to the first electrode layer and coupled to the second electrode layer; and
    a film configured to induce tensile stress in the second electrode layer in response to increased temperature.

13. The light modulator of claim 12, wherein the substrate comprises a material exhibiting a first thermal expansion coefficient, and the film exhibits a second thermal expansion coefficient, wherein the first thermal expansion coefficient is greater that the second thermal expansion coefficient.

14. The light modulator of claim 12, wherein the film comprises a nickel-iron alloy.

15. The light modulator of claim 12, wherein the film comprises a lithium aluminum silicate (LAS).

16. The light modulator of claim 12, wherein the film comprises a material having a low coefficient of thermal expansion.

17. The light modulator of claim 12, wherein the film comprises a material having a negative coefficient of thermal expansion.

18. The light modulator of claim 12, wherein the film comprises a material having a lower coefficient of thermal expansion than the second electrode layer.

19. The light modulator of claim 12, wherein the film comprises a material having a lower coefficient of thermal expansion than the substrate.

20. A light modulator comprising:
    means for supporting a light modulator;
    means for conducting a first electrical signal;
    means for conducting a second electrical signal;
    means for coupling the means for supporting the light modulator to the means for conducting a second electrical signal and forming a cavity between the means for conducting a first electrical signal and the means for conducting a second electrical signal;
    means for reflecting light being substantially parallel to the means for conducting a first electrical signal and coupled to the means for conducting a second electrical signal; and
    means for inducing tensile stress in the means for conducting a second electrical signal in response to increased temperature.

21. The light modulator of claim 20, wherein the cavity is configured to cause interference between at least two wavelengths of electromagnetic radiation.

22. The light modulator of claim 20, wherein the means for inducing tensile stress is located below the means for supporting a light modulator.

23. A method of manufacturing a light modulator comprising:
    providing a substrate;
    forming a first electrode layer over the substrate;
    forming a second electrode layer over the substrate;
    forming a film configured to induce tensile stress in the second electrode layer in response to increased temperature;
    forming a support connecting the substrate to the second electrode layer; and
    forming a reflective surface substantially parallel to the first electrode layer and coupled to the second electrode layer, the reflective surface movable along a direction substantially perpendicular to the reflective surface.

24. The method of claim 23, wherein the film is embedded within the substrate.

25. The method of claim 23, wherein the film has a shape of a grid.

26. The method of claim 23, wherein the film comprises a material having a low coefficient of thermal expansion.

27. The method of claim 23, wherein the film comprises a material having a negative coefficient of thermal expansion.

28. A light modulator made by the process of claim 23.

29. A method for balancing thermal coefficients to maintain tension in an interferometric modulator having a substrate and a movable layer separated by a cavity, the interferometric modulator further having a reflective surface on the movable layer facing the cavity, the cavity being configured to cause interference between at least two wavelengths of electromagnetic radiation, the method comprising:

selecting a material having a first coefficient of thermal expansion for a substrate;

selecting a material having a second coefficient of thermal expansion for a movable layer; and selecting a film based at least in part on a comparison of the first coefficient of thermal expansion and the second coefficient of thermal expansion so as to maintain tension in the movable layer.

30. The method of claim 29, wherein the film is located below the substrate.

31. A method for balancing thermal coefficients to maintain tension in a MEMS device having a substrate and a movable layer separated by a cavity, and a plurality of support structures, the method comprising:

selecting a material having a first coefficient of thermal expansion for a substrate;

selecting a material having a second coefficient of thermal expansion for a movable layer; and selecting a material having a third coefficient of thermal expansion for a thermal expansion coefficient compensation based at least in part on the first coefficient of thermal expansion so as to maintain tension in the movable layer when the MEMS device is exposed to an increased temperature, wherein the material with the third coefficient of thermal expansion extends continuously beneath the plurality of support structures.

32. A method for balancing thermal coefficients to maintain tension in a MEMS device having a substrate and a movable layer separated by a cavity, the method comprising:

selecting a material for a movable layer of a MEMS device, the material configured to be in tension A at a first temperature and in tension B at a second temperature when suspended between support structures of the MEMS device, wherein the tension B is less than the tension A; and selecting a material for a second layer of the MEMS device, the material having a coefficient of thermal expansion that maintains the movable layer at the tension A when the movable layer is at the second temperature, wherein the second layer extends continuously beneath the support structures.

33. The light modulator of claim 12, further comprising:

a display;

a processor that is in electrical communication with said display, said processor being configured to process image data;

a memory device in electrical communication with said processor.

34. The system of claim 33, further comprising:

a driver circuit configured to send at least one signal to said display.

35. The apparatus of claim 34, further comprising:

a controller configured to send at least a portion of said image data to said driver circuit.

36. The apparatus of claim 33, further comprising:

an image source module configured to send said image data to said processor.

37. The apparatus of claim 36, wherein said image source module comprises at least one of a receiver, transceiver, and transmitter.

38. The apparatus of claim 33, further comprising:

an input device configured to receive input data and to communicate said input data to said processor.

* * * * *

UNITED STATES PATENT AND TRADEMARK OFFICE
CERTIFICATE OF CORRECTION

PATENT NO.         : 7,161,730 B2
APPLICATION NO.    : 11/188130
DATED              : January 9, 2007
INVENTOR(S)        : Philip D. Floyd It is certified that error appears in the above-identified patent and that said Letters Patent is hereby corrected as shown below:

On Title Page (56) Page 2, Col. 2, (U.S. Patent Documents), line 56, please delete "Rhoades" and insert --Rhoads--, therefor.

On Title Page (56) Page 4, Col. 1 (U.S. Patent Documents), line 18, please delete "Pichl" and insert --Piehl--, therefor.

On Title Page (56) Page 4, Col. 2 (Other Publications), line 14, please delete "Quanum" and insert --Quantum--, therefor.

On Title Page (56) Page 4, Col. 2 (Other Publications), line 38, please delete "568-573," and insert --568-573.--, therefor.

On Col. 13, line 16 please delete "$\sigma_F = (E_F/(1-v_F))(\alpha_s - \alpha_{NTE})(T-300)$" and inert -- $\sigma_f = (E_f/(1-v_f))(\alpha_s - \alpha_{NTE})(T-300)$ -- therefor.

In Col. 3, line 9, please delete "strucures" and insert --structures--, therefor.

In Col. 14, line 2, please delete "fore" and insert -- for --, therefor.

In Col. 15, line 5, please delete "900$a$" and insert -- 900 --, therefor.

UNITED STATES PATENT AND TRADEMARK OFFICE
CERTIFICATE OF CORRECTION

PATENT NO.       : 7,161,730 B2
APPLICATION NO.  : 11/188130
DATED            : January 9, 2007
INVENTOR(S)      : Philip D. Floyd It is certified that error appears in the above-identified patent and that said Letters Patent is hereby corrected as shown below:

In Col. 17, line 63, Claim 13, please delete "that" and insert --than--, therefor.

Signed and Sealed this

Eleventh Day of September, 2007

JON W. DUDAS
*Director of the United States Patent and Trademark Office*